(12) United States Patent
Huang et al.

(10) Patent No.: US 10,812,552 B2
(45) Date of Patent: Oct. 20, 2020

(54) VOLTE COMMUNICATION METHOD AND BASE STATION THEREOF

(71) Applicant: CLOUDMINDS (SHENZHEN) ROBOTICS SYSTEMS CO., LTD., Shenzhen, Guangdong (CN)

(72) Inventors: William Xiao-qing Huang, New York City, NY (US); Haitao Jiang, Guandong (CN); Zhenkai Wang, Guandong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/418,193

(22) Filed: May 21, 2019

(65) Prior Publication Data

US 2019/0273770 A1  Sep. 5, 2019

Related U.S. Application Data

(63) Continuation of application No. PCT/CN2016/098367, filed on Sep. 7, 2016.

(51) Int. Cl.
*H04L 29/06* (2006.01)
*G10L 19/24* (2013.01)
(Continued)

(52) U.S. Cl.
CPC .............. *H04L 65/60* (2013.01); *G10L 19/22* (2013.01); *G10L 19/24* (2013.01);
(Continued)

(58) Field of Classification Search
None
See application file for complete search history.

(56) References Cited

U.S. PATENT DOCUMENTS 10,148,703 B2 * 12/2018 Mufti ................. H04L 65/1069
2013/0046534 A1   2/2013 Rabipour
(Continued)

FOREIGN PATENT DOCUMENTS

| CN | 103858160 A | 6/2014 |
| CN | 104247496 A | 12/2014 |
| WO | WO2018031614 A1 * | 2/2018 |

OTHER PUBLICATIONS

CMCC: "TP for VoLTE/Video codec adaptation", 3GPP TSG-RAN WG2 Meeting #95, Goteborg, Sweden, Aug. 22-26, 2016; R2-165297, 2 pages.
(Continued)

*Primary Examiner* — Anh Vu H Ly

(57) ABSTRACT

A VoLTE communication method and a base station thereof are disclosed. The method includes: receiving a VoLTE communication request sent by a calling terminal; determining and sending a first suggestion complying with the VoLTE communication carried out by the calling terminal to a network side, the first suggestion including a first suggested speech coding mode and a corresponding code rate thereof; receiving from the network side a final speech coding mode and a corresponding code rate that are determined based on the first suggested speech coding mode and the corresponding code rate; and sending the final speech coding mode and the corresponding code rate to the calling terminal, such that the speech coding mode and the corresponding cod rate may be adjusted synchronously on the both side of the VoLTE communication.

13 Claims, 7 Drawing Sheets

(51) Int. Cl.
    *H04M 7/00*     (2006.01)
    *G10L 19/22*     (2013.01)
    *H04W 28/02*     (2009.01)
    *H04W 84/04*     (2009.01)

(52) U.S. Cl.
    CPC ......... *H04M 7/0072* (2013.01); *H04W 28/02* (2013.01); *H04W 84/042* (2013.01)

(56) References Cited

U.S. PATENT DOCUMENTS

| | | | |
|---|---|---|---|
| 2013/0194937 A1 | 8/2013 | Sridhar | |
| 2014/0105041 A1* | 4/2014 | Swaminathan | H04L 47/38 370/252 |
| 2014/0362764 A1* | 12/2014 | Aksu | H04L 65/80 370/328 |
| 2015/0092575 A1* | 4/2015 | Khay-Ibbat | H04W 24/08 370/252 |
| 2016/0021163 A1* | 1/2016 | Lee | H04L 65/1069 370/352 |
| 2016/0359942 A1* | 12/2016 | Li | H04L 65/1069 |
| 2017/0117985 A1* | 4/2017 | Bruhn | H04L 1/0002 |
| 2017/0195932 A1* | 7/2017 | McDiarmid | H04W 36/30 |
| 2017/0332281 A1* | 11/2017 | Bouvet | H04W 76/10 |
| 2019/0037001 A1* | 1/2019 | Fujishiro | H04W 74/0833 |

OTHER PUBLICATIONS

3rd Generation Partnership Project: Technical Specification Group Radio Access Network; Evolved Universal Terrestrial Radio Access (E-UTRA); Study on Voice and Video enhancement for LTE (Release 14); 3GPP TR 36.750 vo.3.0 (Aug. 2016) 15 pages.

International Search Report dated Jun. 12, 2017; PCT/CN2016/098367.

* cited by examiner

VOLTE COMMUNICATION METHOD AND BASE STATION THEREOF

CROSS-REFERENCE TO RELATED APPLICATIONS

This application is a continuation of International Application No. PCT/CN2016/098367, with an international filing date of Sep. 7, 2016, the entire contents of which are incorporated herein by reference.

TECHNICAL FIELD

Embodiments of the present application relate to the technical field of communications, and in particular, relate to a VoLTE communication method and a base station thereof.

BACKGROUND

Long-term evolution (LTE), as an evolved technology of 3G, has such unique technical advantages as high data rate, low delay, flexible bandwidth configuration and the like. LTE provides IP data packet-based voice services by using an IP multimedia subsystem, whereas VoLTE carries out communication based on a packet switched domain of LTE.

VoLTE communication includes three speech coding modes, AMR, AMR-WB and EVS. A core network explicitly marks congestion in IP packets to trigger selection of AMR, AMR-WB and EVS and adjustment of code rate of speech coding for the VoLTE communication, that is, an explicit congestion notification (ECN) solution.

SUMMARY

An embodiment of the present application provides a VoLTE communication method. The VoLTE communication method includes: receiving a VoLTE communication request sent by a calling terminal; determining and sending a first suggestion complying with the VoLTE communication carried out by the calling terminal to a network side, the first suggestion including a first suggested speech coding mode and a corresponding code rate thereof; receiving from the network side a final speech coding mode and a corresponding code rate that are determined based on the first suggested speech coding mode and the corresponding code rate; and sending the final speech coding mode and the corresponding code rate to the calling terminal, such that the calling terminal sets up the VoLTE communication.

Another embodiment of the present application provides a base station. The base station includes: at least one processor; a memory communicably connected to the at least one processor; wherein the memory stores computer-executable instructions that are executable by the at least one processor, wherein the computer-executable instructions, when being executed by the at least one processor, cause the at least one processor to perform the steps of: receiving a VoLTE communication request sent by a calling terminal; determining and sending a first suggestion complying with the VoLTE communication carried out by the calling terminal to a network side, the first suggestion including a speech coding mode and a corresponding code rate of the first suggestion; receiving from the network side a final speech coding mode and a corresponding code rate that are determined based on the first suggested speech coding mode and the corresponding code rate; and sending final speech coding mode and the corresponding code rate to the calling terminal, such that the calling terminal sets up the VoLTE communication.

Still another embodiment of the present application provides a non-volatile computer-readable storage medium storing computer-executable instructions that are executable by a computer. The computer executable instructions, when being executed, cause the computer to perform the steps of: receiving a VoLTE communication request sent by a calling terminal; determining and sending a first suggestion complying with the VoLTE communication carried out by the calling terminal to a network side, the first suggestion including a speech coding mode and a corresponding code rate; receiving from the network side a final speech coding mode and a corresponding code rate that are determined based on the first suggested speech coding mode and the corresponding code; and sending the final speech coding mode and the corresponding code rate to the calling terminal, such that the calling terminal sets up the VoLTE communication.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

The present application is further described with reference to the accompanying drawings and exemplary embodiments.

Through long-term researches, the inventors of the present application have identified that in adjustment of a speech coding mode of VoLTE communication by using an ECN solution, as long as there is no ECN-CE marker or severe packet loss or delay jitter, a communication terminal may up-shift a code rate, and otherwise, the communication terminal may down-shift the code rate. However, with respect to the communication terminal, a network transmission state thereof is not stable and varies in real time. In this case, if the code rate is frequently adjusted, user experience may frequently vary. For example, assuming that a current code rate of the communication terminal is AMR 8.85, when there is no ECN-CE marker, the code rate may be up-shifted to AMR 12.65, and in this case, the communication terminal has an optimal performance. However, since the communication terminal is not perceptive to network congestion, the code rate may be continuously up-shifted to AMR 23.85. In this case, network congestion may be caused, and a core network may be trigged to send an ECN-CE marker, such that the communication terminal may down-shift the code rate to ARM 12.65. In addition, in the VoLTE communication, both a calling terminal and a called terminal generally adjust the code rate on a single side respectively. However, in single-side code rate adjustments, if the other party of the communication does not adjust the code rate, resources may be wasted, and user experience may not be improved.

Figure 1:
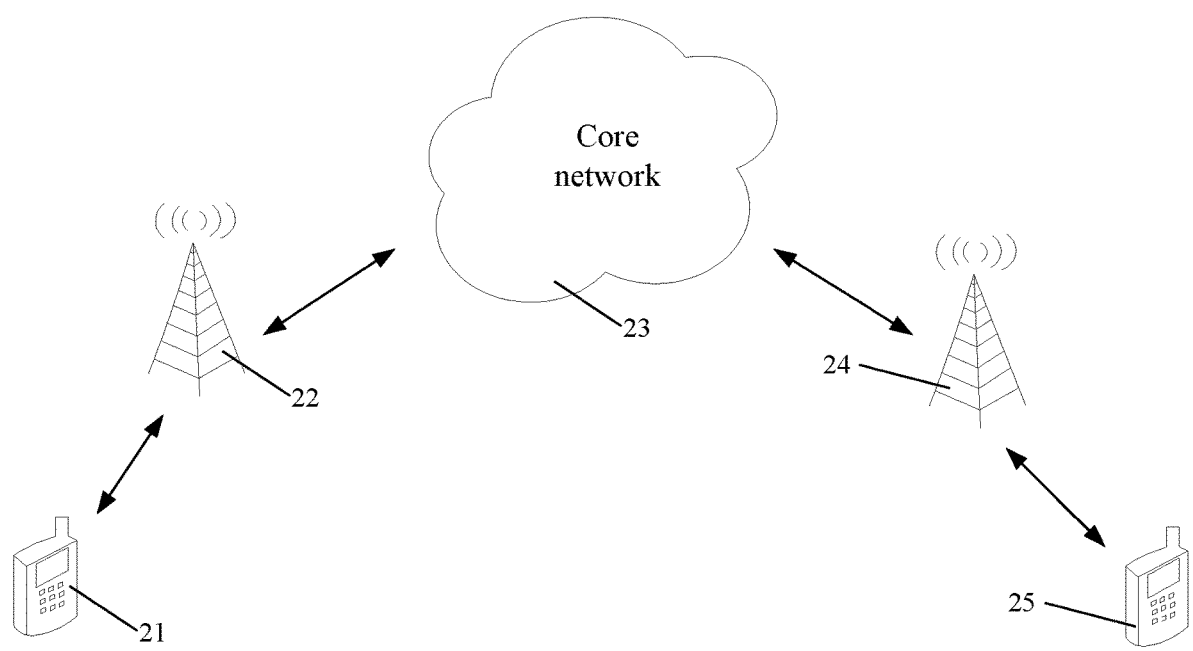
FIG. 1 is a schematic diagram of a network communication system according to an embodiment of the present application.

To address the problem of resource waste in single-side adjustments of the speech coding mode and the code rate of the VoLTE communication, in the present application, the speech coding mode and the code rate of the VoLTE communication are synchronously adjusted via negotiation between the two sides, such that the speech coding modes and the code rates on the two sides are synchronized. Referring to FIG. 1, a network communication system 20 include a calling terminal 21, a calling base station 22, a core network 23, a called base station 24 and a called terminal 25. The calling terminal 21 is within a coverage of the calling base station 22, and a communication connection is set up between the calling terminal 21 and the calling base station 22. The called terminal 25 is within a coverage of the called base station 24, and a communication connection is set up between the called terminal 25 and the called base station 24. The calling base station 22 and the called base station 24 are both communicably connected to the core network 23. The core network 23 and the called base station 24 are all referred to as a network side hereinafter. In addition, the calling terminal 21 and the calling base station 22 are referred to as a calling side, and the called terminal 25 and the called base station 24 are referred to as a called side.

Figure 2:
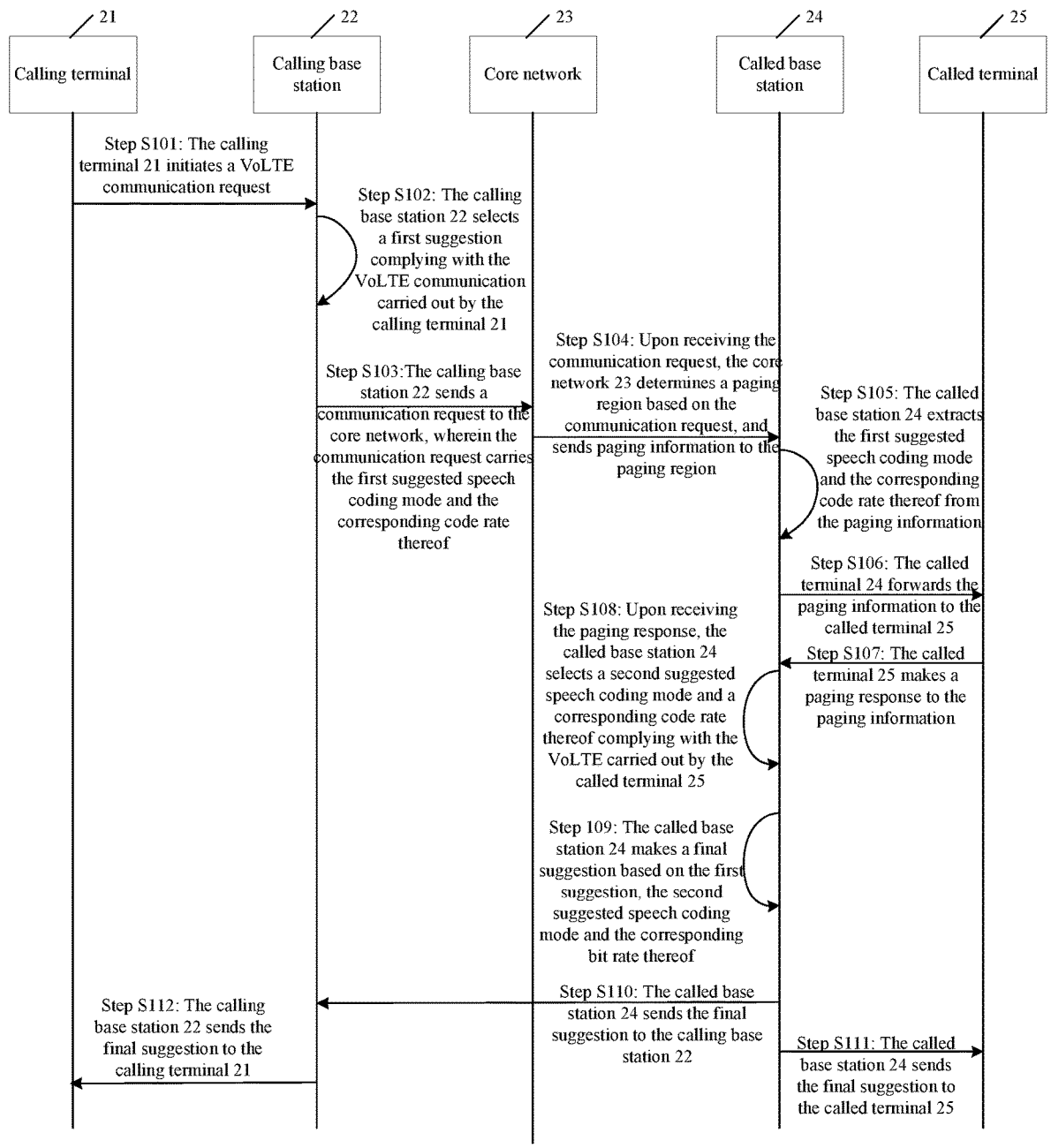
FIG. 2 is a flowchart of determining a second suggestion by a called base station in VoLTE communication according to the present application.

Referring to FIG. 2, the calling side and the called side negotiate with each other to adjust the speech coding mode and the code rate of the VoLTE communication by the following steps:

Step S101: When the calling terminal 21 needs to carry out VoLTE communication, the calling terminal 21 initiates a VoLTE communication request, wherein the communication request carries an identifier of the called terminal 25.

Step S102: Upon receiving the communication request, the calling base station 22 selects a first suggestion complying with the VoLTE communication carried out by the calling terminal 21, wherein the first suggestion includes a first suggested speech coding mode and a corresponding code rate thereof.

Step S103: Upon matching the first suggested speech coding mode and the corresponding code rate thereof for the VoLTE communication, the calling base station 22 sends a communication request to the core network, wherein the communication request carries the first suggested speech coding mode and the corresponding code rate thereof.

Step S104: Upon receiving the communication request, the core network 23 determines a paging region based on the communication request, and sends paging information carrying the identifier of the called terminal 25, the first suggested speech coding mode and the corresponding code rate to the paging region.

The paging information is used for paging the called terminal 25. Since the called base station 24 is a unique device via which the called terminal is connected to the core network 23, the paging information firstly reaches the called base station 24.

Step S105: Upon discovering the paging information, the called base station 24 extracts the first suggested speech coding mode and the corresponding code rate thereof from the paging information.

Step S106: The called terminal 24 forwards the paging information to the called terminal 25.

Step S107: Upon receiving the paging information and detecting that a response may be made to a call, the called terminal 25 makes a paging response. The paging response is used for notifying the core network 23 that the called terminal 25 may make a response to the call. The paging response is also forwarded by the called base station 24 to the core network 23.

Step S108: Upon receiving the paging response made by the called terminal 25 for responding to the paging information, the called base station 24 selects a second suggested speech coding mode and a corresponding code rate thereof complying with the VoLTE carried out by the called terminal 25.

Step S109: The called base station 24 makes a final suggestion based on the first suggestion, the second suggested speech coding mode and the corresponding code rate thereof.

Step S110: The called base station 24 sends the final suggestion to the calling base station 22, wherein the final suggestion includes a final speech coding mode and a corresponding code rate thereof.

Step S111: The called base station 24 sends the final suggestion to the called terminal 25, wherein the final suggestion includes the final speech coding mode and the corresponding code rate thereof.

In negotiation about the speech coding mode and the code rate of the VoLTE communication, to ensure that the transmission resources of the calling side and the called side both satisfy the coding requirement, specifically, during selection of the speech coding mode and the code rate, the final speech coding mode and the corresponding code rate thereof are one group, which consumes fewer transmission resources, from groups of the first suggested speech coding mode and the corresponding code rate thereof, and a second suggested speech coding mode and a corresponding code rate thereof.

Step S112: Upon receiving the final suggestion, the calling base station 22 sends the final suggestion to the calling terminal 21, such that the calling terminal 21 sets up the VoLTE communication.

Figure 3:
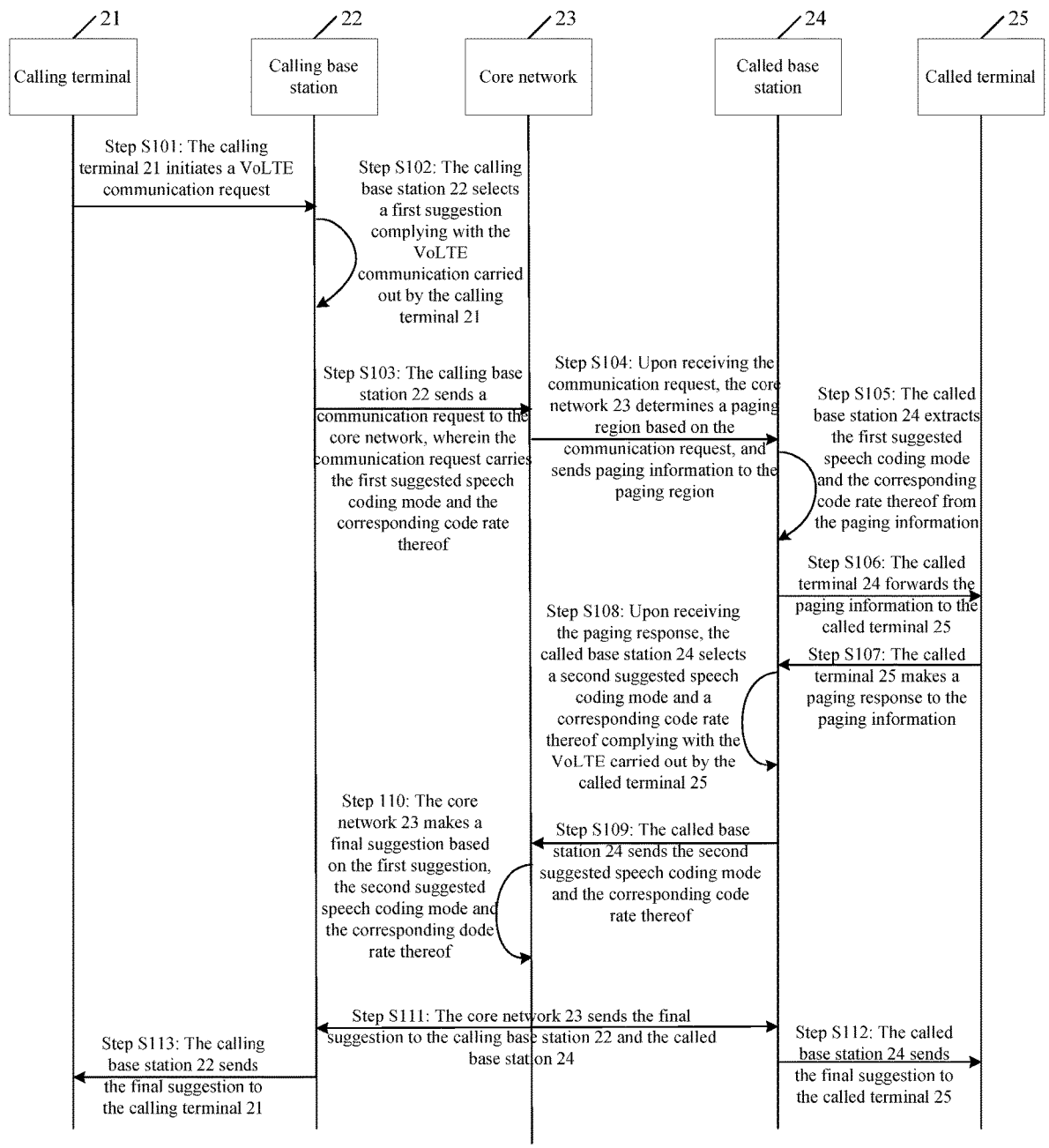
FIG. 3 is a flowchart of determining a second suggestion by a core network in VoLTE communication according to the present application.

It should be noted that in other alternative embodiments, the final suggestion may also be made by the core network 23. In this case, after the second suggested speech coding mode and the corresponding code rate thereof are determined, the called base station 24 may report the second suggested speech coding mode and the corresponding code rate thereof to the core network 23, such that the core network 24 makes a selection, as illustrated in FIG. 3.

Step S109 may also be specifically: reporting the second suggested speech coding mode and the corresponding code rate thereof to the core network 23.

Step S110 may also be specifically: making the final suggestion by the core network 23 based on the first suggestion and the second suggestion, and sending the final suggestion to the calling base station 22 and the called base station 24, wherein the final suggestion includes the final speech coding mode and the corresponding code rate thereof.

The final speech coding mode and the corresponding code rate thereof are also one group, which consumes fewer transmission resources, from groups of a first recommended speech coding mode and a corresponding code rate thereof, and a second recommended speech coding mode and a corresponding code rate thereof.

Step S111: The core network 23 sends the final suggestion to the calling base station 22 and the called base station 24.

Step S112: The calling base station 22 sends the final suggestion to the calling terminal 21.

Step S113: The called base station 24 sends the final suggestion to the called terminal 25.

Upon receiving the final suggestion, the calling base station 22 sends the final suggestion to the calling terminal 21, such that the calling terminal 21 sets up the VoLTE communication. Upon receiving the final suggestion, the called base station 24 sends the final suggestion to the called terminal 25, such that the called terminal 25 sets up the VoLTE communication.

It should be noted that for the sake of an optional definition of the VoLTE communication, the first suggested speech coding mode and the corresponding code rate thereof are maximum allowable speech coding mode and code rate that are determined by the calling base station 22, and the second suggested speech coding mode and the corresponding code rate are maximum allowable speech coding mode and code rate that are determined by the called base station 24.

Firstly, the calling base station 22 selects the first suggested speech coding mode and the code rate corresponding to the first suggested speech coding mode complying with the VoLTE communication carried out by the calling terminal 21, then the called base station 24 selects the second suggested speech coding mode and the corresponding code rate thereof complying with the VoLTE communication carried out by the called terminal 25, and afterwards, a conservative group is selected from groups of the first suggested speech coding mode and the corresponding code rate thereof, and the second suggested speech coding mode and the corresponding code rate thereof as the final speech coding mode and the corresponding code rate thereof. Since the final speech coding mode and the corresponding code rate thereof are the conservative group selected from the groups of the first suggested speech coding mode and the corresponding code rate thereof, and the second suggested speech coding mode and the corresponding code rate thereof, the calling terminal 21, the calling base station 22, the called terminal 25 and the called base station 24 all support the final speech coding mode and the corresponding code rate thereof. This prevent the case where one side does not support the transmission resources desired by the speech coding mode and the corresponding code rate thereof, and effectively prevents mismatch of the transmission resources due to respective adjustments of the speech coding mode and the code rate on the two sides, and thus addresses resource waste.

Figure 4:
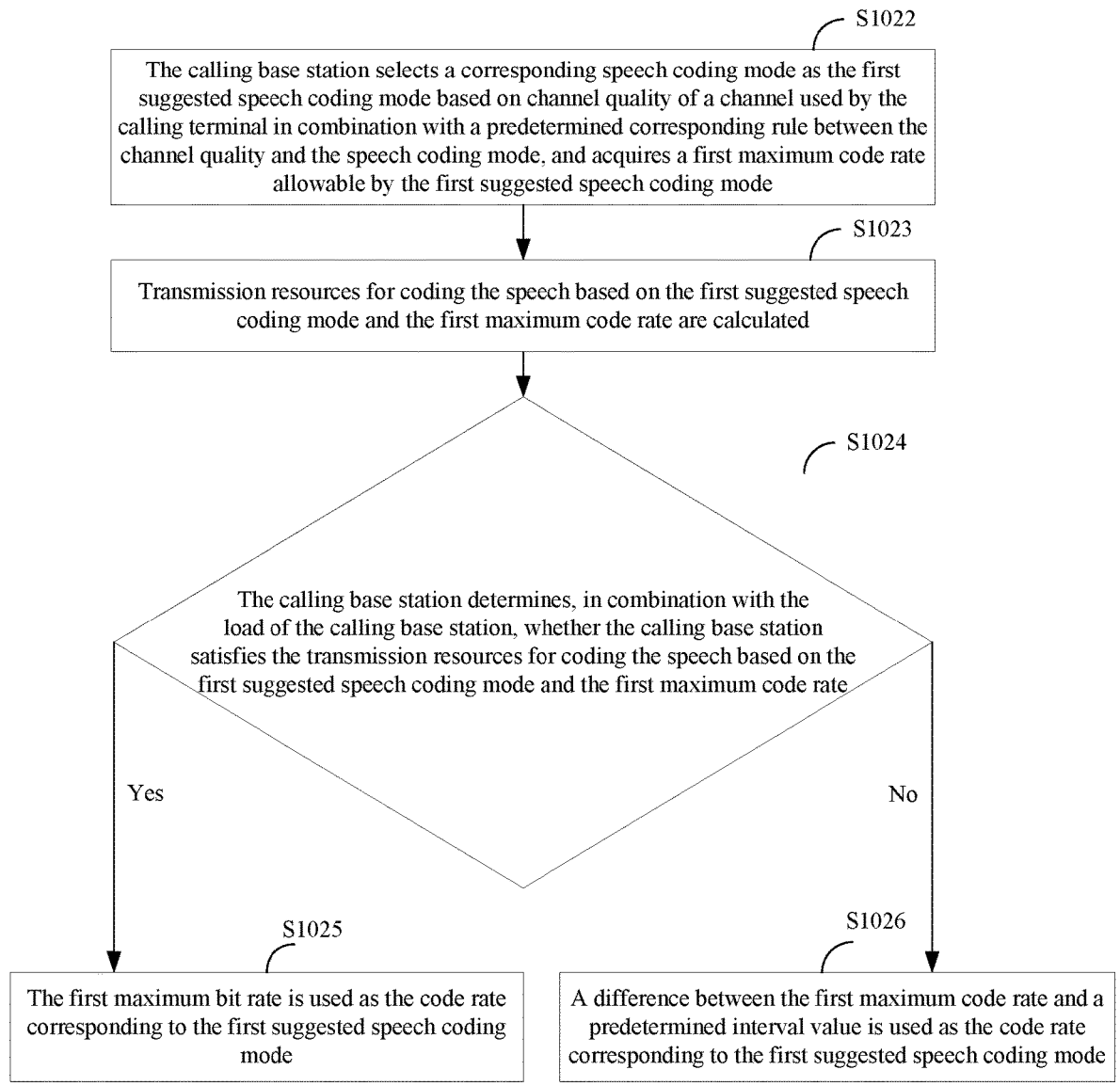
FIG. 4 is a flowchart of determining a first suggested speech coding mode and a corresponding code rate thereof by a calling base station based on load thereof and channel quality of a channel used by a calling terminal according to the present application.

Further, in one implementation of the present application, the first suggestion may be determined based on load of the calling base station 22 and channel quality of the calling terminal 21. Specifically, as illustrated in FIG. 4, the calling base station 22 determines the first suggestion based on the load of the calling base station 22 and the channel quality of the calling terminal 21 by the following steps:

Step S1022: The calling base station 22 selects a corresponding speech coding mode as the first suggested speech coding mode based on channel quality of a channel used by the calling terminal 21 in combination with a predetermined corresponding rule between the channel quality and the speech coding mode, and acquires a first maximum code rate allowable by the first suggested speech coding mode.

The predetermined corresponding rule between the channel quality and the speech coding mode records a corresponding relation between the channel quality, the speech coding mode and the maximum code rate. In this embodiment, the channel quality may be SINR or CQI, and the predetermined corresponding rule between the channel quality and the speech coding mode may be a corresponding rule between SINR or CQI and the speech coding mode. For example, when SINR is greater than 16 dB, an AMR-WR speech coding mode is used and the maximum code rate is 23.85 kbps; and when SINR is greater than 10 dB and less than 16 dB, an AMR speech coding mode is used and the maximum code rate is 12.2 kbps.

Step S1023: Transmission resources for coding the speech based on the first suggested speech coding mode and the first maximum code rate are calculated.

Step S1024: The calling base station 22 determines, in combination with the load of the calling base station 22, whether the calling base station 22 satisfies the transmission resources for coding the speech based on the first suggested speech coding mode and the first maximum code rate.

Step S1025: If the calling base station 22 satisfies the transmission resources for coding the speech based on the first suggested speech coding mode and the first maximum code rate, the first maximum code rate is used as the code rate corresponding to the first suggested speech coding mode.

Step S1026: If the calling base station 22 does not satisfy the transmission resources for coding the speech based on the first suggested speech coding mode and the first maximum code rate, a difference between the first maximum code rate and a predetermined interval value is used as the code rate corresponding to the first suggested speech coding mode.

In another implementation of the present application, when initiating the VoLTE communication, the calling terminal 21 may also determine a first recommended speech coding mode and a corresponding code rate thereof, and upload the first recommended speech coding mode and the corresponding code rate thereof to the calling base station 22. Upon determining a second recommended speech coding mode and a corresponding code rate thereof based on the channel quality and load of the calling terminal 21, the calling base station 22 selects one group, which consumes fewer transmission resources, from groups of the first recommended speech coding mode and the corresponding code rate thereof, and the second recommended speech coding mode and the corresponding code rate thereof as the first suggested speech coding mode and the corresponding code rate thereof. The first recommended speech coding mode and the corresponding code rate thereof are maximum allowable speech coding mode and code rate that are determined based on a measurement value of a signal-to-interference and noise ratio of a reference symbol or a channel quality indication of the calling terminal 21. It should be noted that in this implementation, the calling base station 22 selects one group from the groups of the speech coding mode and the corresponding code rate uploaded by the calling terminal 21, and the speech coding mode and the corresponding code rate determined by the calling base station 22 as the first suggested speech coding mode and the corresponding code rate thereof. However, in the previous implementation, the speech coding mode and the corresponding code rate determined by the calling base station 22 are directly used as the first suggested speech coding mode and the corresponding code rate thereof.

Figure 5:
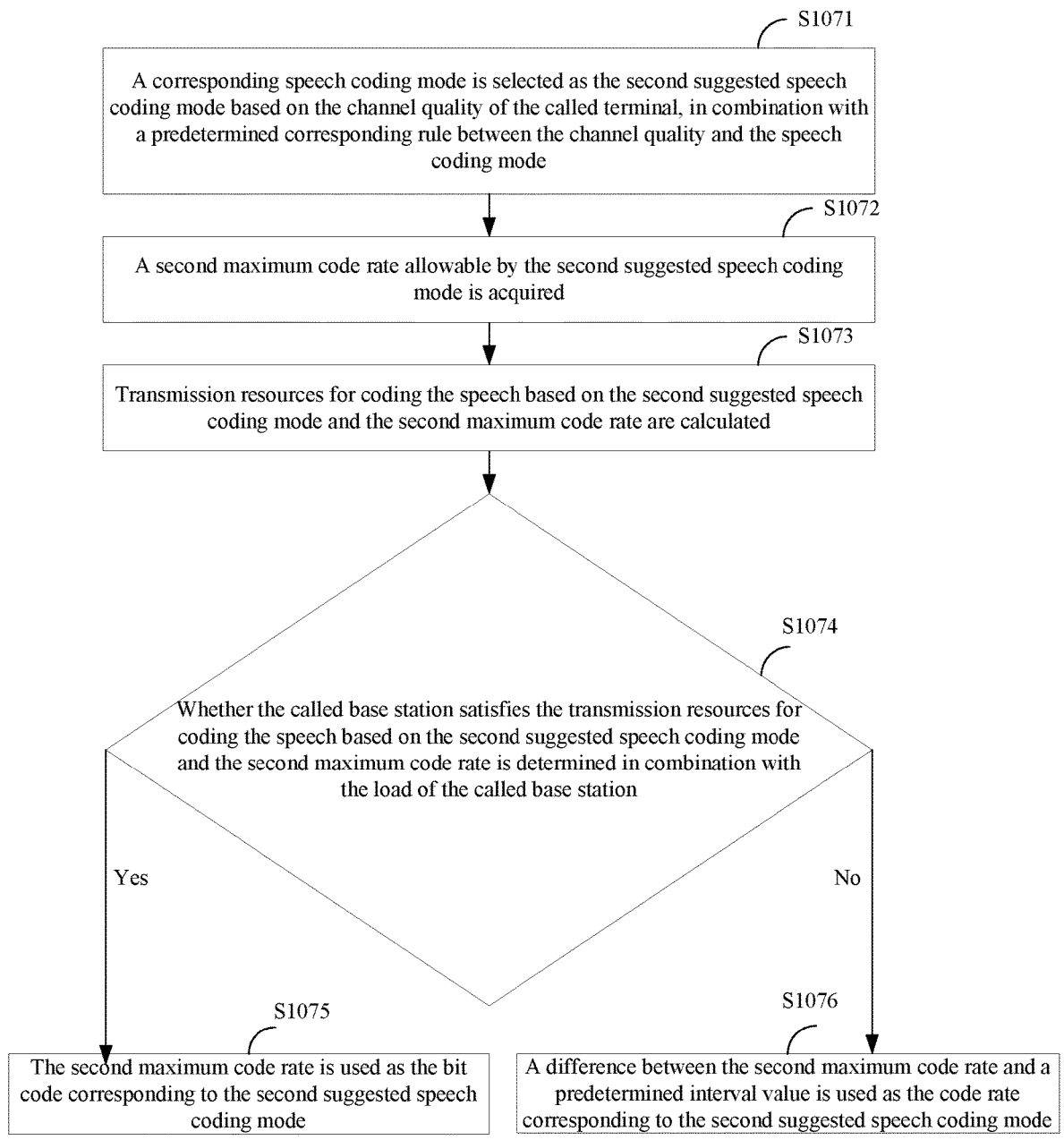
FIG. 5 is a flowchart of determining a second suggested speech coding mode and a corresponding code rate thereof by a called base station based on load thereof and channel quality of a channel used by a called terminal according to the present application.

The called base station 24 determines the second suggested speech coding mode and the corresponding code rate thereof mainly based on channel quality of a channel used by the called terminal 25 and load of the called base station 24, and the second suggested speech coding mode and the corresponding code rate thereof are maximum allowable speech coding mode and code rate thereof that are determined by the called base station 24. Specifically, as illustrated in FIG. 5, the called base station 24 determines the second suggested speech coding mode and the corresponding code rate thereof based on the channel quality of the channel used by the called terminal 25 and the load of the called base station 24 by the following steps:

Step S1071: A corresponding speech coding mode is selected as the second suggested speech coding mode based on the channel quality of the called terminal 25, in combination with a predetermined corresponding rule between the channel quality and the speech coding mode.

The channel quality of the channel used by the called terminal 25 is determined based on a measurement result of an uplink sounding signal or a channel quality indication feedback of the called terminal 25.

Step S1072: A second maximum code rate allowable by the second suggested speech coding mode is acquired.

Step S1073: Transmission resources for coding the speech based on the second suggested speech coding mode and the second maximum code rate are calculated.

Step S1074: Whether the called base station 24 satisfies the transmission resources for coding the speech based on the second suggested speech coding mode and the second maximum code rate is determined in combination with the load of the called base station 24.

Step S1075: If the called base station 24 satisfies the transmission resources for coding the speech based on the second suggested speech coding mode and the second maximum code rate, the second maximum code rate is used as the code rate corresponding to the second suggested speech coding mode.

Step S1076: If the called base station 24 does not satisfy the transmission resources for coding the speech based on the second suggested speech coding mode and the second maximum code rate, a difference between the second maximum code rate and a predetermined interval value is used as the code rate corresponding to the second suggested speech coding mode.

In the embodiment of the present application, when the calling terminal 21 initiates the VoLTE communication, the calling base station 22 firstly determines the first suggestion including the first suggested speech coding mode and the corresponding code rate thereof, and sends the first suggestion to the network side. Upon making the second suggested speech coding mode and the corresponding code rate thereof, the network side selects one group, which consumes fewer transmission resources from the groups of the first suggested speech coding mode and the corresponding code rate thereof, and the second suggested speech coding mode and the corresponding code rate thereof as the final speech coding mode and the corresponding rate thereof. In this way, the speech coding mode and the code rate for the VoLTE communication carried out by the calling terminal 21, the calling base station 22, the called terminal 25 and the called base station 24 are determined via negotiation, such that the calling terminal 21, the calling base station 22, the called terminal 25 and the called base station 24 all support the speech coding mode and the code rate. This effectively prevents mismatch of the transmission resources due to respective adjustments of the speech coding mode and the code rate on the two sides, and thus addresses resource waste.

Figure 6:
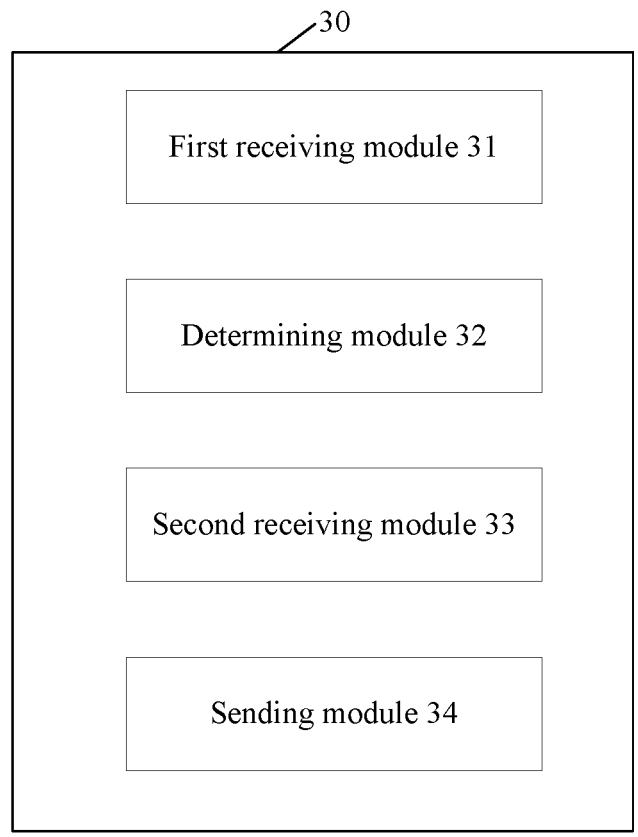
FIG. 6 is a schematic view of a base station according to an preferred embodiment of the present application.

The present application further provides a calling base station embodiment. Referring to FIG. 6, a calling base station 30 includes a first receiving module 31, a determining module 32, a second receiving module 33 and a sending module 34.

The first receiving module 31 is configured to receive a VoLTE communication request from a calling terminal, wherein the VoLTE communication request carries an identifier of a called terminal. The determining module 32 is configured to determine and send a first suggestion complying with VoLTE communication carried out by the calling terminal to a network side, wherein the first suggestion includes a first suggested speech coding mode and a corresponding code rate thereof. The second receiving module 33 is configured to receive a final suggestion returned by the network side, wherein the final suggestion is made by the network side based on the first suggestion, and the final suggestion includes a final speech coding mode and a corresponding code rate thereof. The sending module 34 is configured to send the final suggestion to the calling terminal, such that the calling terminal sets up the VoLTE communication.

It should be noted that upon receiving the final suggestion, the network side further sends the final suggestion to the called terminal in addition to sending the final suggestion to the calling base station, such that the called terminal also carries out the VoLTE communication based on the final suggestion.

The speech coding mode and the code rate thereof for the VoLTE communication carried out by the calling terminal, the calling base station, the called terminal and a called base station are determined via negotiation, such that the calling terminal, the calling base station, the called terminal and the called base station all support the speech coding mode and the code rate. This effectively prevents mismatch of the transmission resources due to respective adjustments of the speech coding mode and the code rate on the two sides, and thus addresses resource waste.

Further, the network side includes a core network and the called base station, and the second suggestion may be made by the called base station or made by the core network. The final speech coding mode and the corresponding code rate thereof in the final suggestion are one group, which consumes fewer transmission resources, from groups of the first suggested speech coding mode and the corresponding code rate thereof, and a second suggested speech coding mode and a corresponding code rate thereof. The second suggested speech coding mode and the corresponding code rate thereof are made by the called base station when receiving a paging response made by the called terminal to response to paging information delivered by the core network, and the second suggested speech coding mode and the corresponding code rate thereof are maximum allowable speech coding mode and code rate that are determined by channel quality of a channel used by the called terminal and load of the called base station. The paging information is generated when the core network receives a VoLTE communication request initiated by the calling terminal. The practice that the called base station determines the second suggested speech coding mode and the corresponding code rate thereof based on the channel quality of the channel used by the called terminal and the load of the called base station may be referenced to the VoLTE communication system embodiment, which is thus not described herein any further.

When the final suggestion is made by the core network, the called base station needs to upload the second suggested speech coding mode and the corresponding code rate thereof to the core network. The core network selects one group, which consumes fewer transmission resources, from groups of the first suggested speech coding mode and the corresponding code rate thereof, and the second suggested speech coding mode and the corresponding code rate thereof. Upon determining the final speech coding mode and the corresponding code rate thereof, the core network sends the final suggestion including the final speech coding mode and the corresponding code rate thereof to the called base station and the calling base station respectively.

When the final d suggestion is made by the called base station, the called base station selects one group, which consumes fewer transmission resources, from the groups of the first suggested speech coding mode and the corresponding code rate thereof, and the second suggested speech coding mode and the corresponding code rate thereof as the final speech coding mode and the corresponding code rate thereof. Upon determining the final speech coding mode and the corresponding code rate thereof, the called base station sends the final suggestion including the final speech coding mode and the corresponding code rate thereof.

It should be noted that since the final speech coding mode and the corresponding code rate thereof are one group, which consumes fewer transmission resources, selected form the groups of the first suggested speech coding mode and the corresponding code rate thereof, and the second suggested speech coding mode and the corresponding code rate thereof, such that the calling base station, the calling terminal, the called base station and the called terminal all support the final speech coding mode and the corresponding code rate thereof at the two sides. The first suggested speech coding mode and the corresponding code rate thereof, and the second suggested speech coding mode and the corresponding code rate thereof are maximum speech coding modes and code rates that are allowable on the calling side and the called side respectively. This ensures definition of voice in the VoLTE communication to the greatest extent.

Nevertheless, when initiating the VoLTE communication, the calling terminal may also determine a first recommended speech coding mode and a corresponding code rate thereof, and upload the first recommended speech coding mode and the corresponding code rate thereof to the calling base station. Upon determining a second recommended speech coding mode and a corresponding code rate thereof based on the channel quality and load of the calling terminal, the calling base station selects one group, which consumes fewest transmission resources, from groups of the first recommended speech coding mode and the corresponding code rate thereof, and the second recommended speech coding mode and the corresponding code rate thereof as the first suggested speech coding mode and the corresponding code rate thereof. In this embodiment, the first recommended speech coding mode and the corresponding code rate thereof are maximum allowable speech coding mode and code rate that are determined based on a measurement value of a signal-to-interference and noise ratio of a reference symbol or a channel quality indication of the calling terminal. In other alternative embodiments, the calling terminal may also not upload the first recommended speech coding mode and the corresponding code rate thereof, and instead, the first suggested speech coding mode and the corresponding code rate are directly determined by the calling base station based on the channel quality and load of the calling terminal.

In the embodiment of the present application, when the first receiving module 31 receives the VoLTE communication carried out by the calling terminal, the determining module 32 firstly determines the first suggestion including the first suggested speech coding mode and the corresponding code rate thereof, and sends the first suggestion to the network side. Upon making the second suggested speech coding mode and the corresponding code rate thereof, the network side selects one group, which consumes fewer transmission resources from the groups of the first suggested speech coding mode and the corresponding code rate thereof, and the second suggested speech coding mode and the corresponding code rate thereof as the final speech coding mode and the corresponding rate thereof. In this way, the speech coding mode and the code rate for the VoLTE communication carried out by the calling terminal, the calling base station, the called terminal and the called base station are determined via negotiation, such that the calling terminal, the calling base station, the called terminal and the called base station all support the speech coding mode and the code rate. This effectively prevents mismatch of the transmission resources due to respective adjustments of the speech coding mode and the code rate on the two sides, and thus addresses resource waste.

FIG. 6 is a schematic structural diagram illustrating hardware of an electronic device 40 according to an embodiment of the present application.

As illustrated in FIG. 6, the electronic device 40 includes at least one processor 410 and a memory 430, and FIG. 6 uses one processor 410 as an example.

The at least one processor 410 and the memory 430 may be connected via a bus or in another manner, and FIG. 6 uses connection via the bus as an example. Nevertheless, the electronic terminal 40 may also include a communication module 420, and the electronic terminal 40 is connected to an external device via the communication module 420. For example, a core network communicates with a calling terminal.

The memory 430, as a non-volatile computer readable storage medium, may be configured to store non-volatile software programs, non-volatile computer executable programs and modules, for example, the program instructions/modules corresponding to the VoLTE communication method in the embodiments of the present application (for example, the first receiving module 31, the determining module 32, the second receiving module 33 and the sending module 34 as illustrated in FIG. 4). The non-volatile software programs, instructions and modules stored in the memory 410, when being executed, cause the processor 430 to perform various function applications and data processing of a server, that is, performing the VoLTE communication method in the above method embodiments.

The memory 430 may include a program memory area and data memory area, wherein the program memory area may store operation systems and application programs needed by at least one function; and the data memory area may store data created according to the use of the base station. In addition, the memory 430 may include a high speed random access memory, or include a non-volatile memory, for example, at least one disk storage device, a flash memory device, or another non-volatile solid storage device. In some embodiments, the memory 430 optionally includes memories remotely configured relative to the processor 410. These remote memories may be connected to a base station over a network. Examples of the above network include, but not limited to, the Internet, Intranet, local area network, mobile communication network and a combination thereof.

Figure 8:
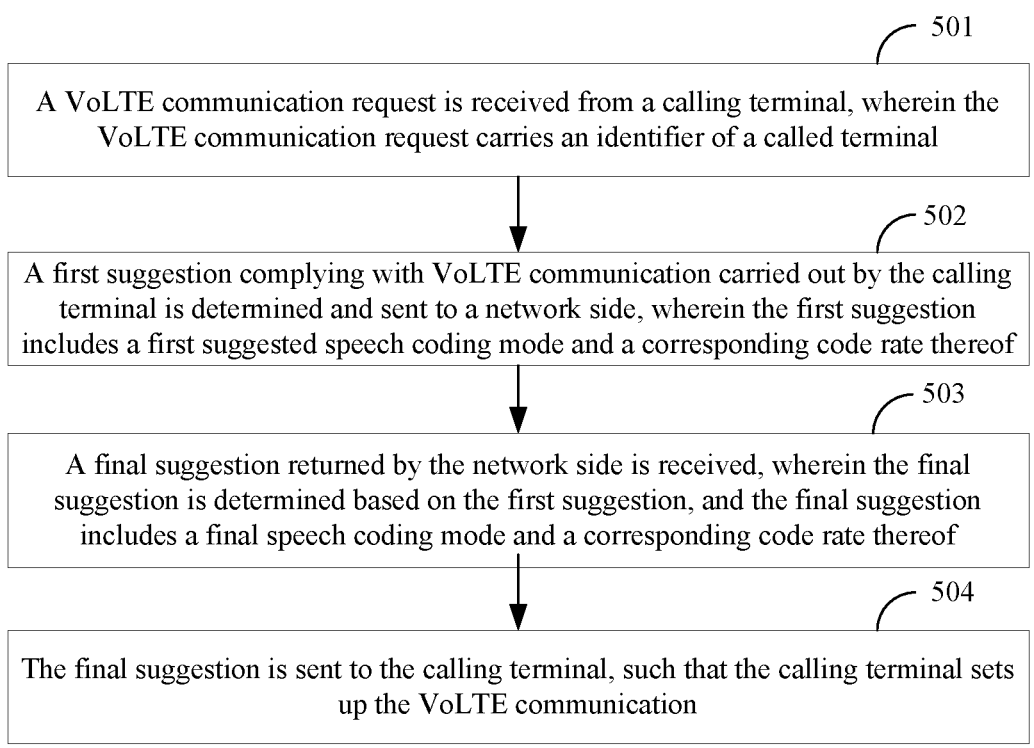
FIG. 8 is a flowchart of a VoLTE communication method according to an embodiment of the present application.

One or more modules are stored in the memory 430, and when being executed by the at least one processor 410, perform the VoLTE communication method in any of the above method embodiments, for example, performing steps 501 to 504 in the method as illustrated in FIG. 8, and implementing the functions of the first receiving module 31, the determining module 32, the second receiving module 33 and the sending module 34 as illustrated in FIG. 6.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

Figure 7:
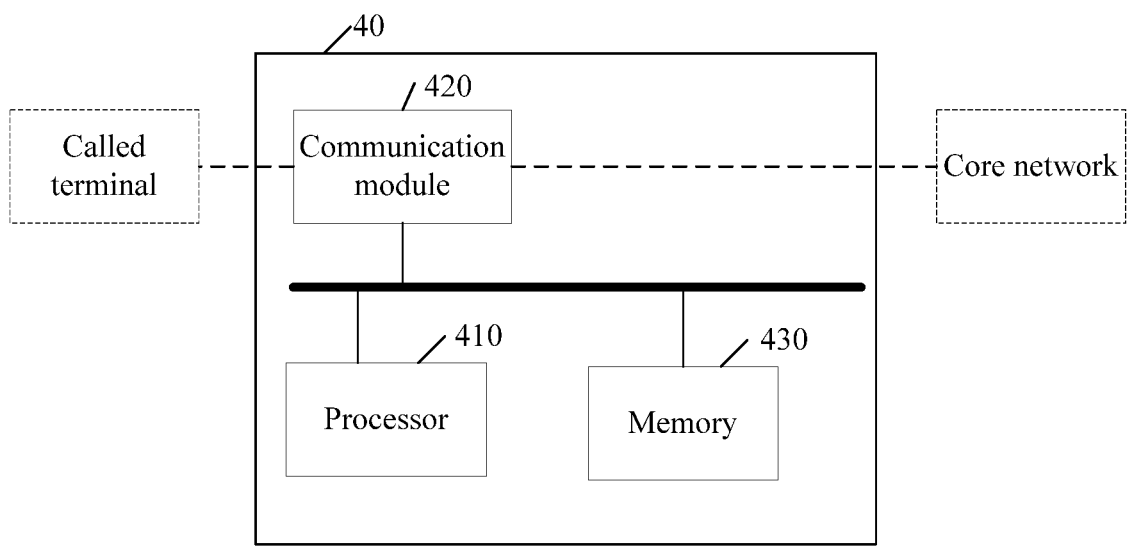
FIG. 7 is a schematic view of an electronic device according to an embodiment of the present application.

An embodiment of the present application further provides a non-volatile computer-readable storage medium. The computer-readable storage medium stores computer executable instructions, which, when being executed by at least one processor, for example, the at least one processor 410 as illustrated in FIG. 7, cause the at least one processor to perform the VoLTE communication method in any of the above method embodiments, for example, performing steps 501 to 504 in the method as illustrated in FIG. 8 and steps 504 to 506 in the method as illustrated in FIG. 8, and implementing the functions of the first receiving module 31, the determining module 32, the second receiving module 33 and the sending module 34 as illustrated in FIG. 6.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

An embodiment of the present application provides a non-volatile computer-readable storage medium. The computer-readable storage medium stores computer-executable instructions, which, when being executed by at least one processor, cause the at least one processor to perform steps 501 to 504 in the method as illustrated in FIG. 8, or implement the functions of the first receiving module 31, the determining module 32, the second receiving module 33 and the sending module 34 as illustrated in FIG. 6.

In the embodiment of the present application, when the calling terminal initiates the VoLTE communication, the calling base station firstly determines the first suggestion including the first suggested speech coding mode and the corresponding code rate thereof, and sends the first suggestion to the network side. Upon making the second suggested speech coding mode and the corresponding code rate thereof, the network side selects one group, which consumes fewer transmission resources from the groups of the first suggested speech coding mode and the corresponding code rate thereof, and the second suggested speech coding mode and the corresponding code rate thereof as the final speech coding mode and the corresponding rate thereof. In this way, the speech coding mode and the code rate for the VoLTE communication carried out by the calling terminal, the calling base station, the called terminal and the called base station are determined via negotiation, such that the calling terminal, the calling base station, the called terminal and the called base station all support the speech coding mode and the code rate. This effectively prevents mismatch of the transmission resources due to respective adjustments of the speech coding mode and the code rate on the two sides, and thus addresses resource waste.

The present application further provides a VoLTE communication method embodiment. Referring to FIG. 8, a VoLTE communication method includes the following steps:

Step 501: A VoLTE communication request is received from a calling terminal, wherein the VoLTE communication request carries an identifier of a called terminal.

The identifier of the called terminal uniquely identifies the called terminal.

Step 502: A first suggestion complying with VoLTE communication carried out by the calling terminal is determined and sent to a network side, wherein the first suggestion includes a first suggested speech coding mode and a corresponding code rate thereof.

Step 503: A final suggestion returned by the network side is received, wherein the final suggestion is determined by the network side based on the first suggestion, and the second suggestion includes a final speech coding mode and a corresponding code rate thereof.

The final speech coding mode and the corresponding code rate thereof are a speech coding mode and a corresponding code rate thereof for the VoLTE communication carried out by the calling terminal, the called terminal, a calling base station and a called base station.

Step 504: The final suggestion is sent to the calling terminal, such that the calling terminal sets up the VoLTE communication.

Nevertheless, in addition to sending the final suggestion to the calling base station, the network side may also send the final suggestion to the called terminal, such that the called terminal and the calling terminal code the speech in the VoLTE communication based on the same speech coding mode and code rate. Since the final suggestion is made based on the first suggestion and the second suggestion, the final speech coding mode and the corresponding code rate thereof are determined via negotiation. This effectively prevents mismatch of the transmission resources due to respective adjustments of the speech coding mode and the code rate on the two sides, and thus addresses resource waste.

Further, the network side includes a core network and the called base station, and the final suggestion may be made by the called base station or made by the core network. The final speech coding mode and the corresponding code rate thereof in the final suggestion are one group, which consumes fewer transmission resources, from groups of the first suggested speech coding mode and the corresponding code rate thereof, and a second suggested speech coding mode and a corresponding code rate thereof, such that the calling terminal, the called terminal, the calling base station, and the called base station all support the final speech coding mode and the code rate. The second suggested speech coding mode and the corresponding code rate thereof are made by the called base station when receiving a paging response made by the called terminal to responding to paging information delivered by the core network, and the second suggested speech coding mode and the corresponding code rate thereof are maximum allowable speech coding mode and code rate that are determined by channel quality of a channel used by the called terminal and load of the called base station. The paging information is initiated when the core network receives a VoLTE communication request initiated by the calling terminal. The practice that the called base station determines the second suggested speech coding mode and the corresponding code rate thereof based on the channel quality of the channel used by the called terminal and the load of the called base station may be referenced to the network communication system embodiment, which is thus not described herein any further.

When the final suggestion is made by the core network, the called base station needs to upload the second suggested speech coding mode and the corresponding code rate thereof to the core network. The core network selects one group, which consumes fewer transmission resources, from groups of the first suggested speech coding mode and the corresponding code rate thereof, and the second suggested speech coding mode and the corresponding code rate thereof. Upon determining the final speech coding mode and the corresponding code rate thereof, the core network sends the second suggestion including the final speech coding mode and the corresponding code rate thereof to the called base station and the calling base station respectively.

When the final suggestion is made by the called base station, the called base station selects one group, which consumes fewer transmission resources, from the groups of the first suggested speech coding mode and the corresponding code rate thereof, and the second suggested speech coding mode and the corresponding code rate thereof as the final speech coding mode and the corresponding code rate thereof. Upon determining the final speech coding mode and the corresponding code rate thereof, the called base station sends the second suggestion including the final speech coding mode and the corresponding code rate thereof.

It should be noted that since the first suggested speech coding mode and the corresponding code rate thereof, and the second suggested speech coding mode and the corresponding code rate thereof are maximum speech coding modes and code rates that are allowable on the calling side and the called side respectively, definition of voice in the VoLTE communication is ensured to the greatest extent.

Nevertheless, when initiating the VoLTE communication, the calling terminal may also determine a first recommended speech coding mode and a corresponding code rate thereof, and upload the first recommended speech coding mode and the corresponding code rate thereof to the calling base station. Upon determining a second recommended speech coding mode and a corresponding code rate thereof based on the channel quality and load of the calling terminal, the calling base station selects one group, which consumes fewest transmission resources, from groups of the first recommended speech coding mode and the corresponding code rate thereof, and the second recommended speech coding mode and the corresponding code rate thereof as the first suggested speech coding mode and the corresponding code rate thereof. In this embodiment, the first recommended speech coding mode and the corresponding code rate thereof are maximum allowable speech coding mode and code rate that are determined based on a measurement value of a signal-to-interference and noise ratio of a reference symbol or a channel quality indication of the calling terminal. In other alternative embodiments, the calling terminal may also not upload the first recommended speech coding mode and the corresponding code rate thereof, and instead, the first suggested speech coding mode and the corresponding code rate are directly determined by the calling base station based on the channel quality and load of the calling terminal.

In the embodiment of the present application, when the calling terminal initiates the VoLTE communication, the calling base station firstly determines the first suggestion including the first suggested speech coding mode and the corresponding code rate thereof, and sends the first suggestion to the network side. Upon making the second suggested speech coding mode and the corresponding code rate thereof, the network side selects one group, which consumes fewer transmission resources from the groups of the first suggested speech coding mode and the corresponding code rate thereof, and the second suggested speech coding mode and the corresponding code rate thereof as the final speech coding mode and the corresponding rate thereof. In this way, the speech coding mode and the code rate for the VoLTE communication carried out by the calling terminal, the calling base station, the called terminal and the called base station are determined via negotiation, such that the calling terminal, the calling base station, the called terminal and the called base station all support the speech coding mode and the code rate. This effectively prevents mismatch of the transmission resources due to respective adjustments of the speech coding mode and the code rate on the two sides, and thus addresses resource waste.

Described above are exemplary embodiments of the present application, but are not intended to limit the scope of the present application. Any equivalent structure or equivalent process variation made based on the specification and drawings of the present application, which is directly or indirectly applied in other related technical fields, fall within the scope of the present application.

What is claimed is:

1. A VoLTE communication method, comprising:
receiving a VoLTE communication request sent by a calling terminal;
determining and sending a first suggestion complying with VoLTE communication carried out by the calling terminal to a network side, the first suggestion comprising a first suggested speech coding mode and a corresponding code rate thereof;
receiving from the network side a final speech coding mode and a corresponding code rate that are determined based on the first suggested speech coding mode and the corresponding code rate; and
sending the final speech coding mode and the corresponding code rate to the calling terminal, such that the calling terminal sets up the VoLTE communication;
the final speech coding mode and the corresponding code rate are one group, which consumes fewer transmission resources, from groups of the first suggested speech coding mode and the corresponding code rate thereof, and a second suggested speech coding mode and a corresponding code rate thereof, wherein the second suggested speech coding mode and the corresponding code rate thereof are a speech coding mode and a maximum allowable code rate that are determined based on channel quality of a channel used by the called terminal and load of a called base station.

2. The method according to claim 1, wherein the channel quality of the channel used by the called terminal is determined based on a measurement result of an uplink sounding signal or a channel quality indication feedback of the called terminal.

3. The method according to claim 1, wherein the first suggested speech coding mode and the corresponding code rate thereof are a speech coding mode and a maximum allowable code rate that are determined based on channel quality of a channel used by the calling terminal and load of a calling base station.

4. The method according to claim 1, wherein the first suggested speech coding mode and the corresponding code rate thereof are one group, which consumes fewer transmission resources, from groups of a first recommended speech coding mode and a corresponding code rate thereof, and a second recommended speech coding mode and a corresponding code rate thereof;
wherein the first recommended speech coding mode and the corresponding code rate thereof are a speech coding mode and a maximum allowable code rate that are determined based on a measurement value of a signal-to-interference and noise ratio of a reference symbol or a channel quality indication of the calling terminal, and the second recommended speech coding mode and the corresponding code rate thereof are a speech coding mode and a maximum allowable code rate that are determined based on channel quality of a channel used by the calling terminal and load of a calling base station.

5. The method according to claim 3, further comprising:
determining whether the calling base station satisfies the transmission resources required for coding the speech based on the first suggested speech coding mode and the maximum allowable code rate;
if the calling base station satisfies the transmission resources required for coding the speech, using the maximum allowable code rate as the code rate corresponding to the first suggested speech coding mode; and
if the calling base station does not satisfy the transmission resources required for coding the speech, using a difference between the maximum allowable code rate and a predetermined interval value as the code rate corresponding to the first suggested speech coding mode.

6. The method according to claim 1, further comprising:
determining whether the called base station satisfies the transmission resources required for coding the speech based on the second suggested speech coding mode and the maximum allowable code rate;
if the called base station satisfies the transmission resources required for coding the speech, using the maximum allowable code rate as the code rate corresponding to the second suggested speech coding mode; and
if the called base station does not satisfy the transmission resources required for coding the speech, using a difference between the maximum allowable code rate and a predetermined interval value as the code rate corresponding to the second suggested speech coding mode.

7. A base station, comprising:
at least one processor;
a memory communicably connected to the at least one processor; wherein the memory stores computer-executable instructions that are executable by the at least one processor, wherein the computer-executable instructions, when being executed by the at least one processor, cause the at least one processor to perform the steps of:
receiving a VoLTE communication request sent by a calling terminal;
determining and sending a first suggestion complying with the VoLTE communication carried out by the calling terminal to a network side, the first suggestion comprising a first speech coding mode and a corresponding code rate of the first suggestion;
receiving from the network side a final speech coding mode and a corresponding code rate that are determined by the network side based on the first suggested speech coding mode and the corresponding code rate; and
sending final speech coding mode and the corresponding code rate to the calling terminal, such that the calling terminal sets up the VoLTE communication;
the final speech coding mode and the corresponding code rate are one group, which consumes fewer transmission resources, from groups of the first suggested speech coding mode and the corresponding code rate thereof, and a second suggested speech coding mode and a corresponding code rate thereof, wherein the second suggested speech coding mode and the corresponding code rate thereof are a speech coding mode and a maximum allowable code rate that are determined based on channel quality of a channel used by the called terminal and load of a called base station.

8. The base station according to claim 7, wherein the channel quality of the channel used by the called terminal is determined based on a measurement result of an uplink sounding signal or a channel quality indication feedback of the called terminal.

9. The base station according to claim 7, wherein the first suggested speech coding mode and the corresponding code rate thereof are a speech coding mode and a maximum allowable code rate that are determined based on channel quality of a channel used by the calling terminal and load of a calling base station.

10. The base station according to claim 7, wherein
the first suggested speech coding mode and the corresponding code rate thereof are one group, which consumes fewer transmission resources, from groups of a first recommended speech coding mode and a corresponding code rate thereof, and a second recommended speech coding mode and a corresponding code rate thereof;
wherein the first recommended speech coding mode and the corresponding code rate thereof are a speech coding mode and a maximum allowable code rate that are determined based on a measurement value of a signal-to-interference and noise ratio of a reference symbol or a channel quality indication of the calling terminal, and the second recommended speech coding mode and the corresponding code rate thereof are a speech coding mode and maximum allowable code rate that are determined based on channel quality of a channel used by the calling terminal and load of a calling base station.

11. The base station according to claim 9, wherein the first suggested speech coding mode and the corresponding code rate are determined by the steps of:
determining whether the calling base station satisfies the transmission resources required for coding the speech based on the first suggested speech coding mode and the maximum allowable code rate;
if the calling base station satisfies the transmission resources required for coding the speech, using the maximum allowable code rate as the code rate corresponding to the first suggested speech coding mode; and
if the calling base station does not satisfy the transmission resources required for coding the speech, using a difference between the maximum allowable code rate and a predetermined interval value as the code rate corresponding to the first suggested speech coding mode.

12. The base station according to claim 7, wherein the second suggested speech coding mode and the corresponding code rate are determined by the steps of:
determining whether the called base station satisfies the transmission resources required for coding the speech based on the second suggested speech coding mode and the maximum allowable code rate;
if the called base station satisfies the transmission resources required for coding the speech, using the maximum allowable code rate as the code rate corresponding to the second suggested speech coding mode; and
if the called base station does not satisfy the transmission resources required for coding the speech, using a difference between the maximum allowable code rate and a predetermined interval value as the code rate corresponding to the second suggested speech coding mode.

13. A non-volatile computer-readable storage medium storing computer-executable instructions that are executable by a computer; wherein the computer executable instructions, when being executed, cause the computer to perform the steps of:
receiving a VoLTE communication request sent by a calling terminal;
determining and sending a first suggestion complying with VoLTE communication carried out by the calling terminal to a network side, the first suggestion comprising a first speech coding mode and a corresponding code rate;
receiving from the network side a final speech coding mode and a corresponding code rate that are determined based on the first suggested speech coding mode and the corresponding code; and
sending the final speech coding mode and the corresponding code rate to the calling terminal, such that the calling terminal sets up the VoLTE communication;
the final speech coding mode and the corresponding code rate are one group, which consumes fewer transmission resources, from groups of the first suggested speech coding mode and the corresponding code rate thereof, and a second suggested speech coding mode and a corresponding code rate thereof, wherein the second suggested speech coding mode and the corresponding code rate thereof are a speech coding mode and a maximum allowable code rate that are determined based on channel quality of a channel used by the called terminal and load of a called base station.

* * * * *